United States Patent [19]

Wilson

[11] 3,882,221

[45] May 6, 1975

[54] PROCESS FOR LIQUID GAS REACTION ON ACID UNDECOMPOSABLE SILICATES

[76] Inventor: Harold W. Wilson, P.O. Box 9851, El Paso, Tex. 79989

[22] Filed: Jan. 10, 1973

[21] Appl. No.: 322,546

[52] U.S. Cl. .............. 423/244; 423/512; 423/539
[51] Int. Cl. ..................... B01j 9/04; C01b 17/00
[58] Field of Search .................. 423/242–244, 423/512, 539

[56] References Cited
UNITED STATES PATENTS

| | | | |
|---|---|---|---|
| 1,271,899 | 7/1918 | Howard et al. | 423/512 |
| 1,908,731 | 5/1933 | Clark | 423/242 |
| 3,547,583 | 12/1970 | Wilson | 423/242 |

Primary Examiner—Oscar R. Vertiz
Assistant Examiner—Gregory A. Heller
Attorney, Agent, or Firm—Clarence A. O'Brien; Harvey B. Jacobson

[57] ABSTRACT

Chemical reactions between gaseous reactants and solutions exhibit a high reaction rate and efficiency when the solution is intimately admixed with an acid undecomposable silicate reactant carrier and the gaseous reactants are passed over and/or through the carrier. Sulfur dioxide removal from waste gases may be enhanced by such a reaction wherein caustic alkali, preferably sodium hydroxide, in the presence of water is physically held on the surface of the silicate carrier and reacted with sulfur dioxide to form water soluble alkali pyrosulfite salts on the surface of the carrier. The sulfur dioxide may be recovered per se by acidifying an aqueous solution of the sulfite salts or may be incorporated in an insoluble salt by neutralizing the aqueous sulfite solution and precipitating an insoluble salt of calcium therefrom. Alternatively, the carrier bound pyrosulfite salt may be reacted with solid, water-free caustic alkali and the reaction product re-exposed to the waste gases to recover additional sulfur dioxide, or the carrier bound salt may be heated to recover 50–60 percent of the sulfur dioxide, then rehydrated and re-exposed to the waste gas stream.

29 Claims, No Drawings

PROCESS FOR LIQUID GAS REACTION ON ACID UNDECOMPOSABLE SILICATES

BACKGROUND OF THE INVENTION

1. Field of the Invention

The present invention relates to gas-liquid reaction systems and more particularly to a process for enchancing the reaction rate and yield of such systems.

2. Description of the Prior Art

Chemical reactions between gaseous reactants and chemical solutions, particularly reactions involving the removal of a undesirable or noxious component of the gas, have heretofore had serious drawbacks which rendered them impractical or uneconomical in large scale applications. Wet processes have been found to be undesirable for a number of reasons, not the least of which includes the difficulties associated with handling the wet reaction products. Dry processes, such as processes which utilize fixed or fluid bed reactions, although of relatively high chemical efficiency, have been found to be impractically uneconomical. One principal drawback in many instances to the use of such bed reactors arises when excessive amounts of energy are required to force a gas or vapor into a static bed of solid particulate matter, and then, to lift and impart continued fluidity or movement to the bed particles. Indeed it has been found that the energy costs of such a physical system, notwithstanding its chemical efficiency is sufficiently prohibitive to preclude its large scale use.

SUMMARY OF THE INVENTION

It is therefore an object of the present invention to provide a process for enhancing the chemical rate and efficiency of gaseous-liquid reactions.

It is another object of the invention to provide an economically feasible and desirable process for removing noxious components of gaseous streams.

It is still another object of this invention to provide a chemically inert carrier for the liquid reactant in a gas-liquid reaction system which carrier substantially enhances the efficiency of reaction.

It is yet another object of this invention to provide a novel process for removing sulfur dioxide gas from waste gas streams utilizing a chemically inert carrier and to recover sulfur dioxide in such a manner that the carrier is reusable.

Other objects and advantages will become apparent from the following description and appended claims.

Briefly stated, in accordance with the aforesaid objects, the present invention provides a method for effecting a chemical reaction between a gaseous stream and a chemical solution, by intimately associating the chemical solution with the vast surface area of an acid undecomposable silicate reactant carrier and flowing the gas stream over and/or through the carrier to contact and react with the solution. This same technique may be employed to facilitate a reaction betwen a gas and a solid, where a liquid medium can be employed to intimately associate the solid with the silicate carrier. In addition, a gas-gas reaction may likewise be enhanced by this process by absorbing a first gas on the silicate particles prior to reacting the first gas with the second gas. For ease of description and because the process was developed in connection with gas-liquid reactions, the process is described solely in terms of a gas-liquid system. It will be appreciated, however, that gas-solid and gas-gas reactions can similarly be enhanced using the silicate carriers of this invention.

The intimate association between the solutin and the silicate particles physically binds the solution on the surface of the silicate carrier. Following reaction with the gas stream the non-gaseous reaction products remain physically bound to the carrier but are readily recoverable therefrom by known techniques. The chemical inertness of the silicate carrier together with its extremely low density and large surface area account for the increased reaction rate and chemical efficiency as well as for its economical adaptability to moving bed reactors.

While the applications of such a gas-liquid-carrier reaction system are limitless, as will be appreciated from the description and examples provided herein, the system has found immediate practical application in the efficient and economical removal of noxious oxides, particularly sulfur dioxide from waste gas streams. As applied to sulfur dioxide removal, the process causes all of the sulfur dioxide present in such gaseous to be chemically combined with caustic alkali in the presence of limited amounts of water held physically by the acid undecomposable silicate carriers, such as perlite, vermiculite and asbestos. The chemical combination results in the formation of water soluble alkali pyrosulfite salts with all reactants initially and all products of reaction being attached physically to particles of the particulated carrier. The sulfur dioxide chemically bound by the carrier-held alkali pyrosulfite is recoverable as sulfur dioxide gas ($SO_2$) per se by acidifying aqueous solutions a sulfite salts, which have been freed mechanically of their contents of insoluble carrier, by treating such sulfite solutions with mineral acids, such as hydrochloric acid, to effect displacement of sulfur dioxide gas. Alternatively, the alkali acid sulfite of the carrier-freed solutions may be converted into neutral alkali sulfite salt by use of caustic alkali solution after which the neutral sulfite salt ($Na_2SO_3$) is converted into a mechanically separable, insoluble calcium salt, such as calcium sulfite ($CaSO_3$), by introducing a water-soluble calcium salt, such as calcium chloride dihydrate, $CaCl_2 \cdot 2H_2O$, into the previously neutralized carrier-freed sulfite solutions. In addition to recovering the sulfur dioxide, the carrier-held pyrosulfite salt may be (1) reacted with solid, water-free caustic alkali, such as NaOH or KOH, or, (2) heated to liberate a portion of the sulfur dioxide present and the residue rehydrated, to regenerate a carrier having alkali thereon which may be re-exposed to the waste gases to recover additional sulfur dioxide.

DETAILED DESCRIPTION OF THE INVENTION

According to the present a gaseous reactant may be brought into contact with a bed of shredded or particulated acid undecomposable silicate carrier which has had its surfaces wetted with a liquid reactant such that there results an intimate association between the particles and the liquid reactant. The reaction products are formed on the surface of the carrier and are physically bound thereto, but may be separated from the carrier by known chemical and/or physical techniques. The gas-liquid reaction which occurs on the carrier surface, due to the low density and large surface area of the particulated carrier, is particularly well adapted to fixed or moving bed reactor techniques. Exemplary of some of the types of gas-liquid reactions contemplated by the process are neutralization, oxidation-reduction, replacement, displacement, sulfonation, ammoniation, substitution, halogenation, in situ polymerization and catalysis reactions.

The term "beds" when used herein in connection with acid undercomposable silicates is employed in its broadest sense. By "beds" is meant an accumulation of silicate material forming a reaction surface for the gas and liquid reactants. No specific physical structure is intended by the term "bed" and none should be implied therefrom.

The term "acid undecomposable silicates" as used herein means silicates of magnesium, calcium, aluminum, and potassium as predominating cationic components, with such silicates preferably containing hydroxyl groups or waters of hydration, and being undecomposable with acids, as exemplified by the following named silicate minerals: actinolite - $Ca(Mg,Fe)_5Si_8O_{22}(OH)_2$; anorthite - $CaAl_2Si_2O_8$; biotite (mica) - $K(Mg,Fe)_3AlSi_3O_{10}(OH)_2$; diopside - $CaMgSi_2O_6$; enstatite - $MgSiO_3$; kaolinite - $Al_4(Si_4O_{10})(OH)_8$; leucite - $KAlSi_2O_6$; perlite - (65–75 percent $SiO_2$, 10–20 percent $Al_2O_3$, 2–5 percent $H_2O$, Na,K,Ca in minor amounts); phlogopite (mica) - $KMg_2Al_2Si_3O_{10}(OH)_2$; sepiolite - $Mg_2Si_3O_8·2H_2O$; serpentine (asbestos) - $Mg_3Si_2O_5(OH)_4$; talc - $Mg_3Si_4O_{10}(OH)$; tremolite - $Ca_2Mg_5Si_8O_{22}(OH)_2$ ; and, vermiculite (mica) - hydrated magnesium, iron, aluminum silicate.

Most preferred are the group of acid undecomposable hydrous silicates of magnesium and/or aluminum and/or iron as represented in part by the compositions known as vermiculite and perlite. Vermiculite is a hydrous magnesium, aluminum, iron silicate composed essentially of 39 percent silicon dioxide ($SiO_2$), 21 percent magnesium oxide (MgO), 15 percent aluminum oxide ($Al_2O_3$), 9 percent iron oxide ($Fe_2O_3$), 5–7 percent potassium oxide ($K_2O$), one percent calcium oxide (CaO), 5–9 percent water ($H_2O$) and small amounts of chromium, manganese, sulfur, phosphorous, and chlorine. Perlite is a volcanic glass having a general composition of about 65–75 percent silica ($SiO_2$), 10–20 percent aluminum oxide ($Al_2O_3$), 2–5 percent water ($H_2O$), and small amounts of soda, potash, and lime. Particularly preferred silicates are vermiculite which has been exfoliated by heat treatment and perlite which has been expanded by heat treatment. These forms of acid undecomposable silicates are preferred because the exfoliation or expansion provides tremendous surface area for wetting and thereby increases the available area for chemical reaction. As a result the chemical solution which wets the carrier is more efficiently utilized and the amount of gas reacted therewith is likewise increased.

In addition to their acid-undecomposibility, exfoliated vermiculite and expanded perlite, as representative examples of hydrous silicates of magnesium and aluminum, have been found by studies to be generally chemically inert in the presence of any of the following: highly concentrated aqueous solutions of caustic alkali such as 50 percent by weight of sodium hydroxide in water; dilute to highly concentrated solutions of strong oxidizing agents such as 3 to 60 percent hydrogen peroxide in water, 0.1 normal to 65 percent by weight sodium dichromate in water solutions and 0.1 normal to 30 percent by weight potassium permanganate in water solutions; dilute to highly concentrated aqueous solutions of mineral acids such as from trace amounts up to 98.5 percent by weight sulfuric acid and 86 percent by weight phosphoric acid; aqueous solutions of amines such as 28 percent by weight ammonium hydroxide; solutions containing dissolved gases such as chlorine, bromine, sulfur dioxide, nitrogen monoxide and ammonia; water soluble and water insoluble organic compounds in general in any concentration such as, for example, hydrocarbons, alcohols, ketones, esters, ethers, amines, carboxylic acids, sulfonic acids, amides, and halogenated and nitrated compounds. In addition, these silicate materials have been determined to be inert to all chemical compounds initially made, present and subsequently formed from the chemical reactions between acidic components present in waste stack gases. The over-all general chemical inertness of these hydrous silicates of magnesium and aluminum seems to persist upon exposure to the above named compositions even at elevated temperatures. For example; 50 gram lots of exfoliated vermiculite combined indvidually with individual 50 gram lots of each of the following aqueous chemical solutions at temperatures ranging from ambient to 125° C. temperature showed little if any to no decomposition as determined by finding little if any to no loss in weight of the vermiculite after its isolation followed by a determination of an absence to a near-absence of any silica, magnesium, or aluminum (or other constituents known to have been present in the vermiculite prior to its having been exposed) in the isolated solution chemical used in the treatmnet of the individual lots of vermiculite: 98.5 percent sulfuric acid, 60 percent hydrogen peroxide, 65 percent sodium chromate dihydrate, 86 percent orthophosphoric acid, 28 percent ammonium hydroxide solution, 6 percent sodium hypochlorite solution, 25 percent potassium permanganate solution, 5 percent iodine-potassium iodide solution, 50 percent sodium hydroxide solution, and 7 percent sulfurous acid. Treatment of additional portions of vermiculite with organic chemical compounds as represented by the previously named groups all heated to or almost to their boiling points prior to their being combined with the vermiculite showed in every case that after exposure and isolation the vermiculite remained essentially unaltered, unattacked chemically, and apparently inert in every respect to the chemical treatment administered. Similar studies of expanded perlite proved it to be similarly inert to chemical decomposition.

Notwithstanding virtually total inertness to chemical combination, it was noted that some grades of exfoliated vermiculites contained as much as five to ten percent of hydrochloric acid soluble matter. Such grades of vermiculite do not fall within the definition of acid undecomposable silicates as used herein unless this minor portion of acid soluble matter is completely removed and the resultant acid insoluble residue washed with water. Following removal and washing, the resulting vermiculite qualifies as an acid undecomposable silicate carrier which is fully and completely usable in every manner as if it had never contained any acid soluble matter in the first place.

The preferred embodiments of this invention, exfoliated vermiculite and expanded perlite, both have specific gravities in the range of 0.1 to 0.2 with weights per cubic foot in the range of 3/4 to 1/2 pounds. Vermiculite has a platelet type highly porous crystalline structure while perlite has a structure consisting of irregular, concentric, convolute, and spheroidal cracks. Both silicate forms contain chemically bound water and when subjected to heating at elevated temperatures are converted into exfoliated vermiculite and expanded perlite respectively with their volumes relative to those of non-heat treated specimens of vermiculite and perlite being increased as much as twenty times and their surface areas likewise becoming vastly increased.

The silicate materials herein referred to as acid undecomposable silicates can be used effectively either individually or in any chosen degree of admixture to permit adjustments of vary wide latitude of specific gravities of a multi-possible number of silicate systems suitable for use in the process of the instant invention. For example, in order to obtain a silicate system of very low density for optimum usage in a fluid bed reactor, in order to obtain minimum pressure drop when waste stack gas is made to pass into such a reactor and to react therein, for example with alkali hydroxide in the presence of water, the following composition by weight can be advantageously employed: 9 parts vermiculite (d.$^{25}$–0.168), 1.5 parts NaOH (d.$^{25}$–2.13), and water (d.$^{25}$–0.997). This composition of matter has a density of 0.379 g/l or a weight per gallon of 3.16 pounds with each pound capable of reacting with approximately 0.25 pound of sulfur dioxide gas. A completely different system containing a mixture of silicate materials for exposure to sulfur dioxide-containing gas in a fixed bed may include the following materials in equal parts by weight: vermiculite, perlite, serpentine (all having particle sizes in the range from 0.005 to 0.125), and sodium hydroxide (NaOH) with the sodium hydroxide introduced into the combination of silicate materials as an aqueous solution containing 75 percent by weight of NaOH. The latter system has a measured specific gravity of 1.013 and is capable of reacting with $SO_2$ where each pound of the reactant material combines with 0.34 pound of sulfur dioxide ($SO_2$) gas.

Acid undecomposable silicate particle size is generally not a critical factor but is ideally in the range from about 0.0005 to 0.150. Particle sizes smaller than 0.005 are too small to be retained in the reactor without a particle entrapment system and tend to exit from the reactor with the gaseous reactant stream. On the other hand, particles larger than 0.150 begin to present substantial obstacles to the flow of gaseous reactant through the system and thus contribute to increased pressure drop and energy costs. Additionally, large prticles increase the density of the carrier system and tend to decrease the rates of reaction and overall chemical efficiency.

The present invention is based on the recognition that the acid undecomposable silicates combine three specific characteristics, viz. general inertness, very low density, and tremendous surface areas, and that when they are mixed with preselected chemical solutions their vast surfaces areas will be covered with the chemical solutions, i.e. the solutions will become intimately mixed or associated with the silicates. When the chemical solution associated silicate carriers are exposed to chemical substances in gaseous or vapor states capable of reacting chemically with the chemical solutions, a very high rate of chemical reaction will take place and a high degree of chemical reaction completion will be observed. This result is attributable to the combination of tremendously increased surface area available for contact by the gas and/or vapor reactants coupled with lower surface tension as compared with systems having limited surface area. For example, a spherical pellet of sodium hydroxide (NaOH) has a volume of approximately one cubic centimeter and a surface area of approximately 4.9 sq. cms. which surface area is the only portion of the entire one cubic centimeter pellet that is capable of contacting and reacting with a gaseous or vaporous chemical compound. On the other hand, a second pellet of sodium hydroxide having the same volume which has been dissolved in an equal volume of water and added to a particle of exfoliated vermiculite having a volume of approximately one cubic centimeter will result in a carrier element containing the same amount of sodium hydroxide but now spread over a multiple number of 4.9 sq. cm. areas all contactable for optimum reactability with vastly increased amounts of reactable gaseous or vaporous chemical compounds. Some experimental studies shown approximate surface area increases of as much as six-hundred (600) fold when comparing reactions of pelletized sodium hydroxide and reactions of exfoliated vermiculite containing equivalent amounts of sodium hydroxide.

The extremely low densities of the acid undecomposable silicates, and particularly of the exfoliated vermiculite and the expanded perlite permit their urage as chemical carriers in "fixed bed" reactors. These reactors are essentially stationary beds or columns of "chemically coated" silicates held in suitable containers such that gaseous or vaporous chemical reactants can be passed into and through such beds to come into contact and react chemically with the reactable chemical solutions physically bound to the surfaces of the otherwise chemically inert silicate carriers. In addition, the same kinds of chemically associated silicate carriers are optimumly useful in "moving bed" reactors. "Fluid bed" reactors are a highly suitable type of moving bed which permit exceptionally high rates of reaction and chemical efficiency, at economical costs, using the present process in comparison with results attainable with identical fluid bed reactors utilizing carriers not possessing the very low densities characteristic of the acid undecomposable silicates of the instant invention.

As previously indicated one drawback to the use of fluid bed reactors arises from the economic cost of the excessive amounts of energy needed to pump the gaseous reactant into the bed and to maintain the bed in a constant state of motion- or "fluidity" - i.e., where the solid particulate matter comprising the bed is made to constantly change its physical position relative to every other solid particle present in the same bed using the energy contributed by the continuously entering gaseous or vaporous matter. One common measurement made to determine the energy requirement is known as pressure drop across the bed, which may be measured by use of mercury or water manometers. The following example demonstrates the superiority of the acid undecomposable silicates of the present invention in economically forming and maintaining a fluid bed as the chemical carrier for liquid reactants in gas-liquid reaction systems.

EXAMPLE I

Two individual chemical compositions, one comprising 40 pounds by weight of exfoliated vermiculite admixed with 20 pounds of a 50 percent by weight aqueous solution of sodium hydroxide (NaOH) to give 60 pounds of reactant, and a second comprising 40 pounds by weight of pulverized waste copper slag admixed with 20 pounds of a 50 percent by weight aqueous solution of sodium hydroxide (NaOH), were separately processed in the same 30 inch diameter fluid bed reactor by directing an 80–100 c.f.m. gas flow of waste gas containing between 0.2 and 0.5 percent sulfur dioxide ($SO_2$) emanating from a copper smelter refinery over each composition. In the case o the sodium hydroxide coated vermiculite bed the recorded pressure drop was between 0.3 and 0.4 inch of standard column (4–5.4 inches of water). In the case of the slag bed the pressure drop was between 6 and 8 inches of standard mercury column (82–109 inches of water).

In addition to pressure drop, the efficiency of the sulfur dioxide removal was monitored. It was noted that the vermiculite - NaOH - $H_2O$ bed removed 100 percent of the sulfur dioxide ($SO_2$) gas present in the waste gas processed for a time period over three times longer than with the slag - NaOH - $H_2O$ system. Chemical examination of the two individual beds after maximum loading with sulfur dioxide gas had taken place showed that the exfoliated vermiculite-sodium hydroxide-water bed had a sulfur dioxide loading almost five times greater than that of the slag-sodium hydroxide-water system bed.

The results of the foregoing Example I show that the efficiency of use of a vermiculite carrier, as representative of the acid undecomposable silicates, is well above three hundred percent in comparison with the system employing identical amounts of reactants but carried by pulverized waste slag (having a density approximately 8 to 10 times greater than either exfoliated vermiculite or expanded perlite). These conclusions were confirmed in studies comparing lime-limestone with acid undecomposable silicates as reactant carriers. Lime-limestone beds exhibited excessively high pressure drops and lower degrees of sulfur dioxide gas loading compared with the low pressure drops and high degrees of sulfur dioxide gas loading obtained with acid undecomposable silicate beds.

The chemical inertness, in general, of the acid undecomposable silicates, and particularly exfoliated vermiculite and expanded perlite, makes possible their use as reactant carriers because they are capable of admixture or intimate association with liquid chemical compounds or with liquids containing dissolved solid chemical compounds. The liquids do not react chemically with the silicate carriers but are physically retained on the surface thereof such that a large quantity of liquid reactant is available to react with gaseous or vaporous matter passing over or through the carrier in contact with the liquid. Mixtures of equal parts by weight (and less in many cases) of the silicate carriers with the liquid reactants result in physical systems having a "free flow" characteristic of a nature very similar to that generally possessed by dry, granulated, solid materials. Thus the carrier-liquid reactant system contemplated is essentially a dry system, containing only sufficient moisture to render it free flowing and to satisfy the chemical requirements of the gas/liquid reaction.

The following example is offered to demonstrate the broad applicability of the acid undecomposable silicate carrier concept to virtually all gas/liquid reaction systems. The feasibility of each of the reactions utilizing acid undecomposable silicates has been confirmed.

EXAMPLE II

For each of the following chemical reactions exfoliated vermiculite or expanded perlits were wetted with the reactant shown in the first (or left) position of the following equations to intimately associate the reactant with the silicate carrier. (In the reactions of Equations II-7, II-9, II-11, II-21, II-22 and II-24, the reactant in the second position of the chemical equation was also used to wet the carrier.) maximum distribution of the reactant(s) over the carrier surface was attained using water as a dispersing aid. Where the reactant was organic and the use of water was not possible, a liquid form of the reactant was employed. The "coated" carrier was contacted with the gaseous or vaporous reactant appearing in the reactant position furthest to the right in the chemical equations. In each case the reaction products were physically held on the carrier and could be removed therefrom and isolated with water or other suitable solvent. Following isolation of the reaction products the residue was the chemically inert silicate carrier which may be re-used in the process as a liquid reactant carrier.

| | | | |
|---|---|---|---|
| II-1. | $2\ NaOH + Cl_2$ | ⟶ | $NaOCl + NaCl + H_2O$ |
| II-2. | $2\ NaOH + CO$ | ⟶ | $Na_2CO_3 + H_2$ |
| II-3. | $Na_2O_2 + CO$ | ⟶ | $Na_2CO_3$ |
| II-4. | $Ca(OH)_2 + CO_2$ | ⟶ | $CaCO_3 + H_2O$ |
| II-5. | $2\ Na_2O_2 + 2\ CO_2$ | ⟶ | $2\ Na_2CO_3 + O_2$ |
| II-6. | $6\ KOH + 3\ CS_2$ (Vapor) | ⟶ | $2\ K_2CS_3 + K_2CO_3 + 3\ H_2O$ |
| II-7. | $8\ NaOCl + 6\ NaOH + CS_2$ (vapor) | ⟶ | $2Na_2SO_4 + Na_2CO_3 + 8NaCl + 3H_2O$ |
| II-8. | $4Na_2O_2 + 2H_2O + H_2S$ | ⟶ | $Na_2SO_4 + 6\ NaOH$ |
| II-9. | $2Na_2O_2 + 2H_2O + RSH$ (RSH=alkanethiol vapor) | ⟶ | $RSO_2ONa + 4\ NaOH$ (sulfonic acid salt) |
| II-10. | $H_2O_2 + RSR$ (RSR=alkylthioalkanes) | ⟶ | $RSOR + H_2O$ (sulfoxides) |
| II-11. | $3Na_2O_2 + 2H_2O + 2NO$ | ⟶ | $2NaNO_3 + 4NaOH$ |
| II-12. | $H_2O_2 + NO$ | ⟶ | $NO_2 + H_2O$ |
| II-13. | $H_2O + 2\ NO_2$ | ⟶ | $HNO_2 + HNO_3$ |
| II-14. | $H_2O_2 + HNO_2$ | ⟶ | $HNO_3 + H_2O$ |
| II-15. | $2KOH + 2\ NO_2$ | ⟶ | $KNO_2 + KNO_3 + H_2O$ |
| II-16. | $2\ NaOH + 3\ NO_2$ | ⟶ | $2\ NaNO_3 + NO + H_2O$ |
| II-17. | $Na_2O_2 + SO_2$ | ⟶ | $Na_2\ SO_4$ |
| II-18. | $H_2SO_4 + 2NH_3$ | ⟶ | $(NH_4)_2SO_4$ |
| II-19. | $8KMnO_4 + 3H_2S$ | ⟶ | $2KOH + 8MnO_2 + 3K_2SO_4 + 2H_2O$ |
| II-20. | $K_2Cr_2O_7 + RSH$ (RSH=mercaptan vapor) | ⟶ | $RSO_2OK + Cr_2O_3 + KOH$ (sulfonic acid salt) |
| II-21. | $2K_2CrO_4 + 2H_2O + 3H_2S$ | ⟶ | $2Cr(OH)_3 + 4KOH + 3\ S$ |
| II-22. | $2Na_2CrO_4 + 2H_2SO_4 + 3SO_2$ | ⟶ | $Cr_2(SO_4)_3 + 2Na_2SO_4 + 2H_2O$ |
| II-23. | $K_2Cr_2O_7 + 4\ SO_2$ | ⟶ | $K_2SO_3 + Cr_2(SO_4)_3$ |
| II-24. | $6KMnO_4 + 4H_2O + 17\ SO_2$ | ⟶ | $2K_2\ S_2O_6 + K_2SO_4 + 6MnSO_4 + 6H_2SO_4$ |
| II-25. | $2CaO + 2\ Cl_2$ | ⟶ | $Ca(OCl)_2 + CaCl_2$ |
| II-26. | $2H_2SO_4 + 2\ C_6H_5NH_2$ (aniline vapor) | ⟶ | $(C_6H_5NH_2)_2H_2SO_4 + H_2SO_4$ (aniline sulfate intermediate) |
| II-26a. | $(C_6H_5NH_2)_2H_2SO_4 + H_2SO_4$ | $\xrightarrow{180°C}$ | $2\ NH_2C_6H_4SO_3 \cdot H_2O$ (sulfanilic acid monohydrate) |

Acid undecomposable silicates as carriers for liquid reactants have been found to have particular applicability to processes for the removal of noxious gases, such as sulfur dioxide, from waste gas streams. Thus a most significant embodiment of the present invention is a process whereby the sulfur dioxide contained in waste gases, such as those derived from smelting pyritic type ores and from burning sulfur-bearing fossil fuels, can be completely removed by bringing such sulfur dioxide-containing waste gaseous into contact with a shredded or particulated acid undecomposable silicate, as hereinbefore described, which silicate has previously has its surface wetted with concentrated solutions of caustic alkali dissolved in water. The alkali pyrosulfite salts formed as a result of the sulfur dioxide reacting with the aqueous caustic alkali solution physically held by the silicate carrier may be dissolved with water and the resultant alkali acid sulfite salt solution mechanically separated from the insoluble silicate carrier to permit re-use of the carrier and recovery of the sulfur dioxide contained in salt form from the carrier-freed solution. One form of recovery may be by acidifying and heating the sulfite salt solution to cause evolution of sulfur dioxide gas. Another form of recovery contemplates neutralizing the carrier-freed sulfite salt solution with caustic alkali, such as NaOH, then precipitating its content of sulfite sulfur in the form of insoluble calcium sulfite ($CaSO_3$) by adding to the solution a sufficient amount of an aqueous solution of a water soluble calcium salt, such as calcium chloride dihydrate - $CaCl_2 \cdot 2H_2O$, and mechanically separating the insoluble calcium sulfite salt, such as centrifuging or filtering. The acid undecomposable silicate carrier materials used in the process have been found to be totally chemically inert -- to the extent that they can repeatedly used with practically no loss except loss associated with physical mishandling.

As will be readily apparent, the present process relies upon acidic matter ($SO_2$ gas) reacting with basic matter (NaOH) in the presence of sufficient water to allow formation of sulfite salts. Thus, acidic gases other than sulfur diozide which are also present in waste gases resulting from smelting pyritic ores and from burning fossil fuels containing sulfur will also react chemically in the process. However, such acidic oxides as those of nitrogen, and acidic matter such as sulfuric acid, are present in these waste gases in such minor amounts in comparison with the amounts of sulfur dioxide gas that they pose no practical obstacle to the efficient removal and recovery of sulfur dioxide from waste gases.

Essentially all of the chemical reactions taking place between the sulfur dioxide and the caustic alkali in this process are stoichiometrically predictable. The following series of chemical equations illustrates the progress of the present process. The symbol "A" is used herein to represent the general class of acid undecomposable silicate carriers useful in the present invention. The caustic alkali is represented by NaOH although it will be appreciated that any of the hydroxides, carbonates and bicarbonates of sodium or potassium are suitable.

As a practical matter, however, based on higher rates of reaction, no gas formation, more general availability and lower cost, NaOH is the preferred caustic alkali.

The reaction that take place as shown in equations 1, 2, and 2a. occur when the silicate carrier is treated with water containing caustic alkali (NaOH) and then with sulfur diozide-containing gases to cause the formation of sodium pyrosulfite hydrate:

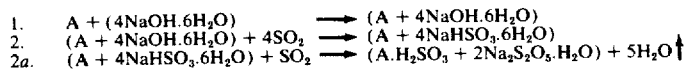

1. $A + (4NaOH.6H_2O) \longrightarrow (A + 4NaOH.6H_2O)$
2. $(A + 4NaOH.6H_2O) + 4SO_2 \longrightarrow (A + 4NaHSO_3.6H_2O)$
2a. $(A + 4NaHSO_3.6H_2O) + SO_2 \longrightarrow (A.H_2SO_3 + 2Na_2S_2O_5.H_2O) + 5H_2O \uparrow$ The reaction shown in equation 3. takes place when the silicate carrier with adsorbed sulfurous acid ($H_2SO_3$) and physically held sodium pyrosulfite is treated with water to isolate and recover both the unreacted, insoluble carrier and the aqueous acid sulfite of sodium salt solution. The sodium sulfite solution is then processed separately for recovery of its content of sulfite sulfur.

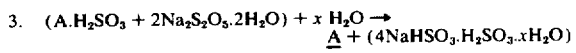

3. $(A.H_2SO_3 + 2Na_2S_2O_5.2H_2O) + x H_2O \rightarrow$
$\underline{A} + (4NaHSO_3.H_2SO_3.xH_2O)$ The reaction in equation 4 takes place when the carrier-feed solution, as recovered from equation 3, (which contains dissolved sodium acid sulfite salt and sulfurous acid) is acidified with a mineral acid such as hydrochloric acid to effect liberation of sulfur dioxide gas to permit its recovery as such.

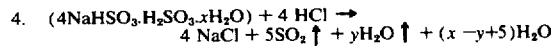

4. $(4NaHSO_3.H_2SO_3.xH_2O) + 4 HCl \rightarrow$
$4 NaCl + 5SO_2 \uparrow + yH_2O \uparrow + (x-y+5)H_2O$ The reactions in equations 5 and 5a. take place when the carrier-freed solution (containing the dissolved sodium acid sulfite salt and sulfurous acid) as recovered from equation 3., instead of being acidified to effect liberation and recovery of sulfur dioxide gas, is neutralized with alkali hydroxide (NaOH) to cause the formation of neutral sodium sulfite salt ($Na_2SO_3$) which in turn is converted into insoluble calcium sulfite salt ($CaSO_3$) by treatment of the alkalineutralized solution with an aqueous solution of a water soluble salt such as calcium chloride dihydrate, $CaCl_2 \cdot 2H_2O$:

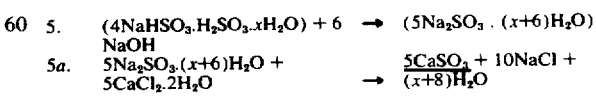

5. $(4NaHSO_3.H_2SO_3.xH_2O) + 6 NaOH \rightarrow (5Na_2SO_3 . (x+6)H_2O)$
5a. $5Na_2SO_3.(x+6)H_2O + 5CaCl_2.2H_2O \rightarrow \underline{5CaSO_3} + 10NaCl + (x+8)H_2O$ It will be appreciated that the neutralizing alkali utilized in the above reaction 5 need not be NaOH. As hereinbefore indicated any hydroxide, carbonate or bicarbonate of sodium or potassium will be suitable. However economic considerations dictate that sodium hydroxide is the preferred alkali. Moreover, it is apparent that twice as much bicarbonate salt would be necessary to effect the same amount of neutralization as can be accomplished using either a hydroxide or carbonate. In addition, it should be understood that the use of calcium chloride dihydrate in equation 5a is merely exemplary of the use of any water soluble calcium salt which will precipitate $CaSO_3$.

In the foregoing process the degree of reaction that occurs between sulfur dioxide gas and caustic alkali depends directly upon water being present in sufficient amount to first react with the sulfur dioxide to allow the In order to assure that the sodium hydroxide is adequately diluted in water and satisfy the empirical standard that the silicate carrier-caustic alkali-water compositions contain between about ten (10) percent and fourteen (14) percent by weight water, but preferably about twelve (12) percent water, Table I is presented to illustrate the range of exemplary optimum parameters for any reaction system made to contain 100 parts by weight of carrier. It is noteworthy that the large the amount of sodium hydroxide used the greater the amount of sulfur dioxide it will be capable of reacting with based on the stoichiometric condition that 1.0 gram of NaOH reacts with 1.6 grams of sulfur dioxide, as shown in equation 6.

Table I

Exemplary Parameters For Complete Removal of $SO_2$ Gas From Waste Gases Containing From 0.05–99.5 Weight Percent $SO_2$

| Carrier used (wt. units) | NaOH sol'n. (wt. units) | Strength of NaOH (percent) | NaOH in NaOH solution (wt. unit) | Water in NaOH solution (wt. unit) | Resultant comp. of matter (wt. units) | Percent water in resultant comp. of matter (wt. units) |
|---|---|---|---|---|---|---|
| 100.0 | 31.3 | 42.5 | 13.3 | 18.0 | 131.3 | 13.7 |
| 100.0 | 34.4 | 47.7 | 16.4 | 18.0 | 134.4 | 13.4 |
| 100.0 | 38.0 | 52.6 | 20.0 | 18.0 | 138.0 | 13.0 |
| 100.0 | 42.5 | 57.6 | 24.5 | 18.0 | 142.5 | 12.6 |
| 100.0 | 48.0 | 62.5 | 30.0 | 18.0 | 148.0 | 12.2 | formation of sulfurous acid, and second, to allow the transitory formation of sodium acid sulfite ($NaHSO_3$), which latter cannot exist except in the presence of some water. Ideally, water should be present not in excess of an amount just sufficient to hold a maximum content of caustic alkali in solution while at the same time permitting such caustic alkali solution to cover a maximum surface area of the silicate particles. The silicate particles in intimate association with the alkali solution should be in a physical state where they exist as free-flowing, essentially dry, fibrous, solid particulate matter. Experiments have shown that in order to approach the ideal conditions a ratio by weight of acid undecomposable silicate particles to water used should be approximately 5:1 regardless of the weight amount of caustic alkali used. The amount of water per se present in any combination of carrier-caustic alkali-water composition employed in this process should ideally be not less than about 10 percent nor more than about 14 percent on a weight basis of such composition. Preferably the weight precent water in the composition is about 12 percent. Reference to equation 2a. shows that the alkali acid sulfite becomes the alkali pyrosulfite salt through the agency of dehydration thus insuring a continued presence of water in the system until complete exhaustion of all caustic alkali originally introduced into the system.

The amount of caustic alkali, such as NaOH, to be used in this process depends primarily on the amount of sulfur dioxide gas that is to be converted into the pyrosulfite salt. Stoichiometrically each two mols of sulfur dioxide will react with two mols of sodium hydroxide to form a one mol of sodium pyrosulfite hydrate as shown in equation 6. below:

The following examples are offered by way of illustration of the present process.

EXAMPLE III 100.00 grams of a naturally occurring, previously untreated lot of asbestos (serpentine mineral) after shredding to particular sizes ranging from approximately 0.08 to 0.12 was mechanically combined with 55 grams of an aqueous solution of sodium hydroxide (NaOH) - (60 percent NaOH by weight). A fixed bed of the resultant semi-flocculant free-flowing, solid composition was exposed to sulfur dioxide gas until chemical tests showed the reaction between the 33.0 grams of sodium hydroxide initially present in the composition exposed and 52.1 grams of sulfur dioxide gas consumed was completed. The resultant product was mixed with about 250 ml. of water after which it was filtered and the insoluble filter cake of asbestos was washed with an additional 50 ml. of water. The filter cake after drying showed a weight of 100.3 grams.

An aqueous solution of sodium hydroxide (NaOH) was added to the asbestos-freed filtrate until the filtrate showed a pH value of 7.1. The solution was then heated to near boiling at which time a slight excess of an aqueous solution of calcium chloride dihydrate ($CaCl_2 \cdot 2H_2O$) was slowly added and stirred in. Complete precipitation of sulfite sulfur resulted in the form of insoluble calcium sulfite salt ($CaSO_3$) which was recovered by filtration, washed free of soluble chloride salts, and then dried to show a weight of 97.2 grams of calcium sulfite, which is equivalent to 51.7 grams of sulfur dioxide. The net recovery of the sulfur dioxide originally reacted with the asbestos associated aqueous sodium hydroxide was 99.2 percent.

EXAMPLE IV

The dried filter cake of asbestos (100.3 grams) from Example III was physically broken up until its particles ranged in size from about 0.08 to 0.10 after which it 6.  $2 SO_2 + 2 NaOH \rightarrow \cdot Na_2S_2O_5 \cdot H_2O$ was treated with NaOH and exposed to sulfur dioxide in the same manner as described in Example III. The recovered filter cake, after drying, showed a weight of 100.0 grams.

EXAMPLE V

The filtrate recovered from Example IV was treated with an excess of hydrochloric acid and boiled. The sulfur dioxide gas was passed into the 100.1 grams of dried filter cake of asbestos recovered in Example IV, which has first been shredded and combined with 55 grams of an aqueous sodium hydroxide solution containing 60 percent NaOH by weight. The resultant asbestos-sodium pyrosulfite composition was then processed with water for removal of the insoluble asbestos, which after drying in filter cake form showed a weight of 100.0 grams. The resultant filtrate (solution of sodium acid sulfite) was treated with a slight excess of aqueous sodium hydroxide solution followed by treatment with an aqueous solution of calcium chloride dihydrate in the same manner as described in Example III to yield 96.8 grams of recovered calcium sulfite salt, which is equivalent to 51.5 grams of $SO_2$, representing a recovery of 98.8 percent of the sulfur dioxide originally reacted with the asbestos associated aqueous sodium hydroxide solution.

EXAMPLE VI

A 50 gram lot of shredded asbestos made to contain 1.0 gram of sodium hydroxide (NaOH) in 10 mls. of water was exposed to a mixed gas stream containing 0.5 percdnt sulfur dioxide gas by volume for approximately three hours during which time period chemical tests showed complete removal of the sulfur dioxide gas from the gas stream. 1.5 grams of sulfur dioxide was consumed by the 1.0 gram of sodium hydroxide present in the NaOH-water-asbestos system employed.

EXAMPLE VII

A 50 gram lot of asbestos in particle form treated with 25 grams of an aqueous solution of sodium hydroxide (60 percent NaOH by wt.) was exposed to 24 grams of 99.8 percent pure sulfur dioxide gas after which the resultant composition was washed free of sodium acid sulfite salts, and the asbestos dried and weighed. The same lot of asbestos was reprocessed six consecutive times in identically the same manner. After each time the recovered dried filter cake of asbestos was weighed. The weights of the asbestos in the order of its processing were found to be as follows: 49.8 grams, 49.6 grams, of 49.5 grams, 49.5 grams, 49.3 grams, and 49.1 grams.

EXAMPLE VIII

The 49.1 gram lot of insoluble, dried asbestos recovered in Example VII after having been previously exposed to treatment with sodium hydroxide (NaOH) and sulfur dioxide gas ($SO_2$) in six consecutive processing was shredded to particle sizes approximating 0.1 inch after which was combined with 20 grams of an aqueous solution of sodium hydroxide (50 percent NaOH by wt.). In a fixed bed the asbestos was exposed to a steam of a mixture of gases comprised of carbon, nitrogen, sulfur oxides, air, nitrogen, and water vapor wherein the content of sulfur dioxide ($SO_2$) amounted to 1.0 percent by volume. The gas stream was passed into the bed of aqueous sodium hydroxide-associated asbestos at a rate of approximately 500 mls. per minute for a time period of approximately 8 hours during which time period constant chemical monitoring showed that 100 percent of the sulfur dioxide contained in the gas mixture was removed by the sodium hydroxide-water-asbestos composition.

In another embodiment of the process, in lieu of recovering the sulfur dioxide from the silicate carrier-bound pyrosulfite salt in the manners hereinbefore described the alkali pyrosulfite salt may be reacted directly with solid, water-free caustic alkali, such as NaOH or KOH, without the addition of any water whatsoever and while still bound to the carrier to cause the alkali pyrosulfite salt to be converted into the neutral alkali sulfite salt ($Na_2SO_3$). The neutral salt remains physically bound to the carrier and can, together with the carrier, be re-exposed to sulfur dioxide-containing gases to react with their content of sulfur dioxide to produce alkali pyrosulfite hydrate salts as hereinbefore described. By alternately treating the carrier-bound alkali pyrosulfite hydrate salt with solid, water-free caustic alkali to cause the formation of the neutral alkali sulfite salt and exposing the neutral sulfite salt to sulfur dioxide-containing gases a continual alternating build-up of alkali pyrosulfite hydrate salt followed by alkali sulfite hydrate salt takes place. With each alternating treatment the total percentage of each of the two salts increases at the exposure of a decrease in percentage carrier in the system. The net result after several complete conversions alternately of alkali pyrosulfite hydrate salt then neutral alkali sulfite hydrate salt is a product containing as much as 85 to 95 percent of either alkali pyrosulfite hydrate or alkali sulfite hydrate salt.

The following series of chemical equations illustrate the chemical reactions taking place which allow this sulfite salt build-up with the attendant relative decrease in carrier content. For simplicity, although the silicate carrier is also present as an ingredient, since it is chemically inert it is not shown in the following equations.

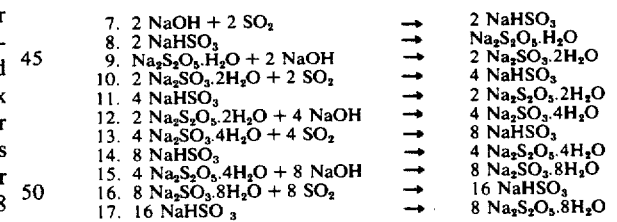

| 7. $2\ NaOH + 2\ SO_2$ | → | $2\ NaHSO_3$ |
| 8. $2\ NaHSO_3$ | → | $Na_2S_2O_5 \cdot H_2O$ |
| 9. $Na_2S_2O_5 \cdot H_2O + 2\ NaOH$ | → | $2\ Na_2SO_3 \cdot 2H_2O$ |
| 10. $2\ Na_2SO_3 \cdot 2H_2O + 2\ SO_2$ | → | $4\ NaHSO_3$ |
| 11. $4\ NaHSO_3$ | → | $2\ Na_2S_2O_5 \cdot 2H_2O$ |
| 12. $2\ Na_2S_2O_5 \cdot 2H_2O + 4\ NaOH$ | → | $4\ Na_2SO_3 \cdot 4H_2O$ |
| 13. $4\ Na_2SO_3 \cdot 4H_2O + 4\ SO_2$ | → | $8\ NaHSO_3$ |
| 14. $8\ NaHSO_3$ | → | $4\ Na_2S_2O_5 \cdot 4H_2O$ |
| 15. $4\ Na_2S_2O_5 \cdot 4H_2O + 8\ NaOH$ | → | $8\ Na_2SO_3 \cdot 8H_2O$ |
| 16. $8\ Na_2SO_3 \cdot 8H_2O + 8\ SO_2$ | → | $16\ NaHSO_3$ |
| 17. $16\ NaHSO_3$ | → | $8\ Na_2S_2O_5 \cdot 8H_2O$ |

The following example illustrates the process of building up large concentrations of either alkali pyrosulfite hydrate salt or alkali sulfite hydrate salt on the silicate carrier.

EXAMPLE IX

A 50 gram lot of asbestos was treated with 20 grams of an aqueous sodium hydroxide solution containing 50percent by weight of sodium hydroxide to give a resultant composition having a total weight of 70 grams. The alkali treated asbestos was exposed to pure sulfur dioxide gas and combined with 16 grams of the gas while losing 10 grams of water to yield a product weighing 76 grams. This product was neutralized by mixing it with 10 grams of dry, solid, flake sodium hydroxide (NaOH) resulting in a product consisting of 41.9 percent by weight $Na_2SO_3 \cdot H_2O$ and 58.1 percent by weight asbestos. This latter product was then treated with an additional lot of 16 grams of pure sulfur dioxide gas. The resultant composition was neutralized with 20 grams of dry, solid, flake sodium hydroxide to form a product consisting of 59.0 percent by weight $Na_2SO_3 \cdot H_2O$ and 41.0 percent by weight asbestos. Four additional repetitions of sulfur dioxide gas exposure followed by neutralization with dry sodium hydroxide resulted in final products consisting of 94.3 percent sodium pyrosulfite hydrate salt ($Na_2S_2O_5 \cdot H_2O$) and 95.8 percent of the neutral sodium sulfite hydrate salt ($Na_2SO_3 \cdot H_2O$) with the balance of each end product being insoluble, unreactable asbestos. Water solvation of the sulfite salts left a residue of asbestos which was reusable in the process.

Still another embodiment of the present process contemplates processing the silicate carrier bound alkali pyrosulfite hydrate salts for the removal of as much as 50–60 percent of their total content of sulfite sulfur as sulfur dioxide by exposing the sulfur dioxide-containing compositions to simple heating at temperatures in the range from about 150°–200°C. Heating at the higher end of the temperature range for short periods of time achieves substantially the same degree of sulfur dioxide removal as heating at the lower temperature for longer periods of time.

Specifically, upon heating the alkali pyrosulfite hydrate salt in the range of 150° – 250°C. for time periods ranging from about fifteen minutes to six hours the salt partially decomposed liberating sulfur dioxide gas. It was also noted that heating the salt at 200°C. for about one-half hour or at 150°C. for about 2.5 hours produced substantially the same effect as heating at 400°C. for as little as about three minutes. In every case between 50 and 60 percent of the sulfite sulfur content of the material processed was found to be liberated in the form of sulfur dioxide gas. With use of temperature exceeding 250°C. for prolonged time periods or with the use of higher temperatures, such as 400°C. or shorter time periods, it was determined that heat decomposition caused the formation of both sulfide sulfur and in some cases even elemental sulfur in addition to the liberation of sulfite sulfur as sulfur dioxide gas. Optimum time and temperature requirements appear to lie in the ranges of 5 to 60 minutes and 200° to 300°C. with the higher the temperature employed the shorter the time of exposure to avoid decomposition of sulfite sulfur into sulfide and sulfate forms.

The reaction mechanisms involved are shown below. As hereinbefore, used "A" represents any suitable acid undecomposable silicate.

(18) 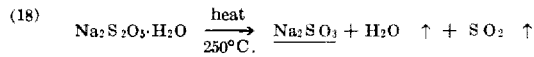

(18a) 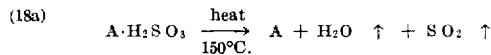

After the silicate-alkali pyrosulfite hydrate has been heat processed as described to remove approximately one mol of its content of sulfite sulfur as sulfur dioxide gas, the residual silicate-alkali sulfite (silicate-$Na_2SO_3$) composition is treated with sufficient water to effect hydration of the silicate-alkali sulfite salt ($Na_2SO_3 + H_2O \rightarrow Na_2SO_3 \cdot H_2O$). It is desirable to hydrate with a slight excess of uncombined water in order to obtain a silicate-alkali sulfite hydrate (silicate-$Na_2SO_3 \cdot H_2O$) containing some unbound water. This resultant product, a hydrated neutral alkali sulfite salt compound bound to a silicate carrier, is now reusable in every respect as before wherein the neutral alkali sulfite hydrate portion reacts with sulfur dioxide gas to form the alkali acid sulfite salt held by the silicate, after which it is converted into the alki pyrosulfite hydrate salt, as shown below:

19.     $Na_2SO_3 \cdot H_2O + SO_2 \rightarrow 2NaHSO_3$
19a.    $2NaHSO_3 \rightarrow Na_2S_2O_5 \cdot H_2O$ It will be appreciated that the herein described heat processing of the alkali pyrosulfite hydrate salt to recover sulfur dioxide followed by hydration to regenerate the silicate held reactant is a continuously repeatable process. Thus the reaction product of equation 19a may be processed in accordance with equation 18 to yield an alkali sulfite which, after hydration, is fully capable of reacting with sulfur dioxide on a 1:1 molar basis as in equation 19.

The following examples illustrate the heat recovery of sulfur dioxide and the reuse of the hydrated silicate alkali sulfite.

EXAMPLE X 100 grams of silicate-alkali hydroxide-water reactant was prepared by mechanically combining 34 grams of an aqueous solution of sodium hydroxide (50 percent NaOH, 50 percent $H_2O$ by weight solution) with 66 grams of perlite having a particle size ranging between 0.005 and 0.150 and a density of 0.133 ($d^{25}$). this free-flowing solid mixture (reactant) was placed in a tube to permit a gas stream containing sulfur dioxide gas to be passed in measured volumes into the tube, through the bed of reactant, and to exit into a monitoring system permitting accurate measurement of any and all sulfur dioxide gas that was removed from the gas stream. Variations of both quality and quantity with regard to sulfur dioxiee gas content of the entering gas stream as well as variations in the rates of such gas passage into the tube were made such that the entering gas stream contained as little as 0.05 percent $SO_2$ by weight to as much as 99.8 percent by weight of $SO_2$ gas with the rates of passage varied between 20 and 2000 mls. of the entering gas per minute. At the instant the $SO_2$ monitoring system showed a trace of $SO_2$ gas (less than 0b 0.001 percent $SO_2$l) exiting from the tube the gas at its source was turned off. Chemical examination of a representative portion of the gas treated reactant in the tube showed it to contain 21.6 grams of chemically bound sulfur dioxide present as sodium pyrosulfite hydrate ($Na_2S_2O_5 \cdot H_2O$) and 2.7 grams of sulfur dioxide present as silicate adsorbed sulfurous acid. The product in the tube had a weight of 127.8 grams of a density of 0.197.

The product was exposed to external heating at a temperature of approximately 200°C. for a time of 12 minutes and showed a weight loss of 31.9 grams. From an examination of the volatile matter given off it was determined that 16.0 grams of $SO_2$ or 50.1 percent of the sulfite sulfur contained by the product prior to the being heat processed had been recovered. Analysis of a representative portion of the residue obtained from the heat processing showed it to contain 16.1 grams of sulfur dioxide present as sodium sulfite ($Na_2SO_3$). Thus the 100 grams os perlite-NaOH-water reactant mixture exposed to a gas stream containing sulfur dioxide gas reacted with 29.3 grams of sulfur dioxide of which 16.1 grams was removed and recovered by the heat processing described.

EXAMPLE XI 90 grams of the residue from the heat processing in Example X was mechanically mixed with about 10 mls, of water, returned to the original reaction tube described in Example X, and exposed to treatment with a gas stream containing sulfur dioxide gas as in Example X. After gassing until monitoring showed no further acceptance of $SO_2$ gas by the material in the reaction tube the product was removed and found to contain 24.1 grams of sulfite sulfur. Heat processing of this product in the same manner as in Example X effected removal of 13.5 grams of sulfur dioxide leaving a residue which was found on analysis to contain 10.6 grams of sulfur dioxide in the form of sodium sulfite ($Na_2SO_3$). After repeating the gassing and heating processing alternately six successive times the product resulting from final exposure to gassing was placed in a container and washed with water after which the water insoluble matter (perlite) was mechanically isolated and dried. The weight of the dried perlite residue was 65.8 grams, only 0.2 gram less than was present in the 100 grams of original silicate-alkali hydroxide mixture employed. This loss was attributed solely to mechanical handling during the multi 1 steps of processing and reprocessing. Chemical examination of the isolated silicate (perlite) residue showed no content of any compounds of either sodium or of sulfur. The density of the dried silicate (perlite) residue was determined to be 0.133 ($d^{25}$), the same value as that possessed by the material prior to its exposure to the several processings. The residue was found to be both physically and chemically identical to the perlite starting material.

EXAMPLE XII

The processes set forth in Example X and XI were repeated using vermiculite, asbestos, mica, talc, kaolinite and enstatite, as the acid undecomposable silicate carrier. Substantially similar results to those in Examples X and XI were obtained. The principal difference between the various silicate materials appears to rest solely in their difference in specific gravities thus making the so-called "heat expanded" mica and volcanic glasses better suited for use in fluid bed reactors due solely to their very low densities.

In view of the fact that sulfur dioxide-containing waste gases in addition to their contents of sulfur dioxide contain some oxidizing substances and some content of particulate solid matter a partial degree of conversion of sulfite to sulfate will occur and additions of solid particulate matter to the silicate carrier-water-caustic alkali systems employed in the process will also occur as a natural consequence of the nature of the sulfur dioxide-containing waste gases. However, since the neutral alkali sulfite salt formed in the process is relatively stable to oxidation and inasmuch as the more easily oxidizable acid sulfite salt exists only transitorily because of a near-absence of any content of unbound water, the over-all degree of hydrolytic oxidation possible is kept to a minimum. Other acidic substances that are present in varying quantities in the waste gases will also consume portions of the caustic alkali, but the amount of alkali so lost has been found to be generally small compared to the amount consumed by the sulfur dioxide gas. However, in the event that acidic substance contamination takes place to the extent that the efficiency of the system become too impaired, the system is treated with water to wash it free of all soluble salt compounds after which the residual silicate compositions become fully reusable merely by recombining them with alkali hydroxide or re-exposure to sulfur dioxide-containing gas streams. Waste gas streams carrying large amounts of solid particles matter cna be efficiently processed according to the present process at the singular expense of increasing weights and volumes of the system and thus it is preferable to mechanically remove as much solid particulate matter as possible prior to treating gases for $SO_2$ removal with this process.

While the present invention has been described with reference to particular embodiments thereof, it will be understood that numerous modifications may be made by those skilled in the art without actually departing from the scope of the invention.

What is claimed as new is as follows:

1. A process for removing sulfur dioxide from a waste gas stream containing same comprising the steps of
   a. forming a bed of particulated acid undecomposable silicates,
   b. wetting the surfaces of the bed particles with an aqueous caustic solution to form an intimate association between said particles and said solution, and
   c. contacting said bed particles with said waste gas stream whereby the sulfur dioxide therein reacts with said alkali solution to form an alkali pyrosulfite reaction product on said particles.

2. A process, as claimed in claim 1, wherein said waste gas stream contains from .05 – 99.5 weight percent sulfur dioxide.

3. A process, as claimed in claim 1, wherein said caustic alkali is selected form the group consisting of the hydroxides, carbonates and bicarbonates of sodium and potassium.

4. A process, as claimed in claim 3, wherein said caustic alkali is sodium hydroxide.

5. A process, as claimed in claim 1, wherein said aqueous solution contains at least sufficient water and render said silicate particles free-flowing, to allow the formation of sulfurous acid and to allow the transitory formation of sodium acid sulfite.

6. A process, as claimed in claim 1, wherein said silicate particle-aqueous caustic alkali solution composition contains from about 10 - 14 percent by weight water.

7. A process, as claimed in claim 6, wherein said composition contains about 12 percent by weight water.

8. A process, as claimed in claim 1, wherein the weight ratio of silicate particles to water in said silicate particle-aqueous caustic alkali solution composition is about 5.1.

9. A process, as claimed in claim 1, wherein said acid undecomposable silicates are selected from the group consisting of the hydrous silicates of magnesium, aluminum, iron and mixtures thereof.

10. A process, as claimed in claim 9, wherein said particles are sized in the range from about .005 – .150 inches.

11. A process, as claimed in claim 10, wherein said acid undecomposable silicates are selected from the group consisting of exfoliated vermiculite, expanded perlite and mixture thereof.

12. A process, as claimed in claim 3, wherein said particles are sized in the range from about 0.005 – .150 inches.

13. A process, as claimed in claim 12, further including the step of treating said alkali pyrosulfite reaction product with water to separate the sulfite values as an aqueous sulfite solution from the silicate particles.

14. A process, as claimed in claim 13, further including the step of recovering sulfur dioxide by acidifying the aqueous sulfite solution with a mineral acid.

15. A process, as claimed in claim 14, wherein said mineral acid is hydrochloric acid.

16. A process, as claimed in claim 13, further including the steps of
 (a) neutralizing said aqueous sulfite solution, and
 (b) precipitating the sulfite values as insoluble calcium sulfite by reacting said neutralized solution with a water soluble calcium salt.

17. A process, as claimed in claim 16, wherein said neutralizing step comprises neutralizing with an aqueous solution of caustic alkali, said alkali being selected from the group consisting of the hydroxides, carbonates and bicarbonates of sodium and potassium.

18. A process, as claimed in claim 17, wherein said alkali is sodium hydroxide.

19. A process, as claimed in claim 17, wherein said water soluble calcium salt is calcium chloride dihydrate.

20. A process, as claimed in claim 12 further including the step of reacting said alkali pyrosulfite on said bed particles with solid, water-free caustic alkali selected from the group consisting of sodium and potassium hydroxide to produce a neutral alkali sulfite salt on said bed particles.

21. A process, as claimed in claim 20, wherein said neutral alkali sulfite salt on said bed particles is exposed to said gas stream to remove an additional moiety of sulfur dioxide from said stream.

22. A process, as claimed in claim 12, further including the step of heating said alkali pyrosulfite on said bed particles to a temperature in the range from about 150°–400° C. to recover sulfur dioxide therefrom.

23. A process, as claimed in claim 22, wherein said heating is accomplished at a tempeature of 200°– 300° C. for a time from about 5–60 minutes.

24. A process, as claimed in claim 22, further including the step of treating the residue from the heating of said alkali pyrosulfite with sufficient water to hydrate same and exposing said hydrated residue to said gas stream to remove an additional moiety of sulfur dioxide therefrom.

25. A process for removing sulfur dioxide from a waste gas stream containing same comprising the steps of
 a. forming a bed of particulated acid undecomposable silicates selected from the group consisting of exfoliated vermiculite, expanded perlite and mixtures thereof, said particles being sized in the range from about .005 – 0.150 inches,
 b. wetting the surfaces of the bed particles with an aqueous sodium hydroxide solution to form an intimate association between said particles and said solution, the composition of said particles and said solution containing from about 10 – 14 percent by weight of water, and
 c. contacting said bed particles with said bed particles with said waste gas stream whereby the sulfur dioxide therein reacts with said sodium hydroxide solution to form a sodium pyrosulfite reaction product on said particles.

26. A process, as claimed in claim 25, further including the steps of
 a. treating said sodium pyrosulfite reaction product with water to separate the sulfite values as an aqueous sulfite solution from the filicate particles, and
 b. recovering sulfur dioxide by acidifying the aqueous sulfite solution with a mineral acid.

27. A process, as claimed in claim 25, further including the steps of
 a. treating said sodium pyrosulfite reaction product with water to separate the sulfite values as an aqueous solution from the silicate particles,
 b. neutralizing said aqueous solution with an aqueous solution of sodium hdyroxide, and
 c. precipitating the sulfite values as insoluble calcium sulfite by reacting said neutralized solution with calcium chloride dihydrate.

28. A process, as claimed in claim 25, further including the steps of
 a. reacting said sodium pyrosulfite on said bed particles with solid, water-free caustic alkali selected from the group consisting of sodium and potassium hydroxide to produce a neutral alkali sulfite salt on said bed particles, and
 b. exposing said neutral alkali sulfite salt on said bed particles to said gas stream to remove an additional moiety of sulfur dioxide therefrom.

29. A process, as claimed in claim 25, further including the steps of
 a. heating said sodium pyrosulfite on said bed particles to a temperature in the range from about 150 –400° C. to recover sulfur dioxide therefrom,
 b. treating the residue from (a) with sufficient water to hydrate same, and
 c. exposing said hydrated residue to said gas stream to remove an additional moiety of sulfur dioxide therefrom.

* * * * *